April 25, 1950 — W. H. MAYBERRY ET AL — 2,505,560
PLANT THINNER
Filed Jan. 9, 1948
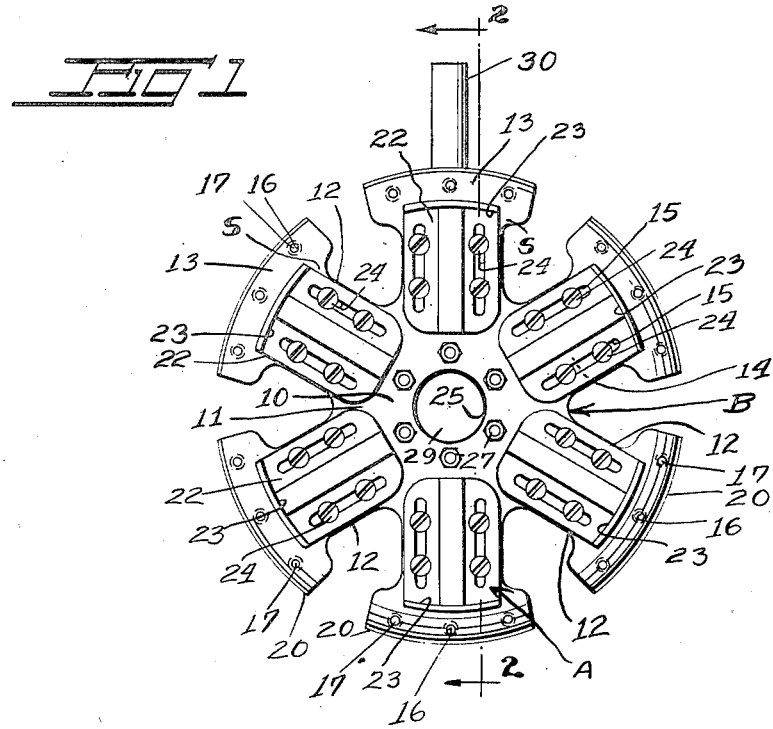
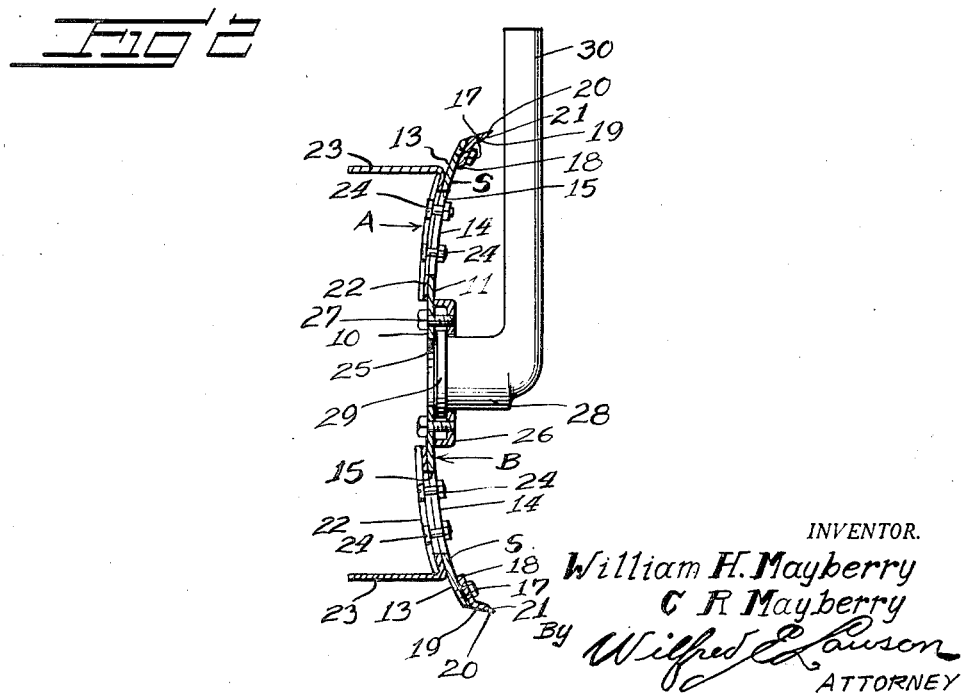
INVENTOR.
William H. Mayberry
C. R. Mayberry
By Wilfred E. Lawson
ATTORNEY Patented Apr. 25, 1950

2,505,560

UNITED STATES PATENT OFFICE 2,505,560

PLANT THINNER

William H. Mayberry and C R Mayberry, Kennett, Mo.

Application January 9, 1948, Serial No. 1,308

2 Claims. (Cl. 97—14)

Our invention relates to agricultural machines and more particularly to cotton choppers.

The object of our invention is to provide a cotton chopper consisting in an attachment adapted to be secured to the front plow connection of a cultivator or the like.

Another object of our invention is to provide a cotton chopper of the character indicated above equipped with cutting blades arranged at a pitch giving the blades a cutting effect instead of the usual chopping motion, which chopping motion results in pushing the attacked plants from the plant row.

A further object of our invention is to provide a cotton chopper of the character indicated above, the cutting blades of which pass at an angle across the plant row instead of straight across the same, eliminating thereby excessive disturbance of the earth adjacent to the remaining plants.

A still further object of our invention is to provide a cotton chopper of the character indicated above equipped with adjusting ground contacting shoes for not only controlling the level at which the cutting blades work in the ground, but for compressing the ground adjacent to those plants left in the row, whereby the plants remain in upright position for further cultivating action.

Other objects of our invention not specifically mentioned, may appear in the following specification describing our invention with reference to the accompanying drawing illustrating a preferred embodiment of our invention is not to be limited or restricted to the exact construction and combination of parts described in the specification and shown in the drawing, but that such changes and modifications may be made, which fall within the scope of the claims appended hereto.

In the several figures of the drawing similar parts are designated by similar reference characters and Figure 1 is a view in side elevation of a cotton chopper constructed in accordance with the present invention.

Figure 2 is a vertical section taken substantially on the line 2—2 of Figure 1.

The cotton chopper attachment forming the subject matter of our invention comprises a body plate B having a flat disk-like center portion 10 and a shallow concaved outer portion 11, which is divided into a plurality of radial spoke-like portions S by cut-outs 12 extending from the rim of the outer portion 11 inwardly to the disk-like central portion 10. The outer end portion 13 of each spoke S is somewhat wider than the main portion 14 thereof and extends beyond both lateral edges of the main spoke portion. Each main spoke portion is provided with two spaced apart, longitudinal slots 15 extending parallel to each other and serving a purpose to be described later. In the wider outer portion 13 of each spoke S a plurality of spaced apart holes 16 is provided. On the concave side of each spoke 13 at the outer end thereof, a cutter blade C is secured by means of bolts 17. Each cutter blade C has an obtuse angular cross section and comprises a fastening flange 18 and a cutting leg 19. The bolts 17 extend through the fastening legs 18 and the holes 16 in the outer portions of the spokes 13. The angular cutter blades are arranged on the spoke, so that the corner 20 of the angle formed by the parts 18 and 19 coincides with the outer edge of the corresponding spoke, and the cutting flange 19 inclines away from the concave surface of the spoke. The outer edge of each cutting flange is beveled to form the cutting edge 21.

On the convex side of each spoke S an adjusting slide A is secured. Each adjusting slide comprises a plate-like body 22 concaved to fit snugly onto the convex side of the corresponding spoke S, and an arcuate foot plate 23 extending from the body 22 at an angle. These plates 23 are in spaced, circular arrangement, forming an interrupted rim on the convex side of the cutter disk. Each adjusting slide A is adjustably secured to the corresponding spoke S by bolts 24 extending through the plate-like body 22 of the slide and through the slots 15 in the spoke S.

Centrally of the flat center portion 10 of the body plate B a hole 25 is provided and a bearing or hub housing 26 is secured by bolts 27 to the inner side of the plate 10 to enclose a bearing flange 29 which forms a part of the stub shaft 28. This stub shaft is formed on and extends at a right angle from a support shank 30 adapted to be secured in the front plow connection of a cultivator or the like (not shown).

When the above described cotton chopper attachment is to be used, the shank 30 is secured to the not shown cultivator in a well known manner and the assembled cutter or chopper is adjusted by turning the shank about its axis until the wheel is in a position to rotate in a plane oblique to the plant row and the cutting blades extend at a desired angle to the row. The angle of the rotating plane of the wheel determines the number of plants to be cut out so that, it will be apparent, the more the plane of rotation of the wheel is swung from parallel relation to the row to a transverse or perpendicular relation, the shorter will be the lengths of the sections of the row removed. Then the slides A are adjusted on the spokes S, so that the distance between the outer surface of the foot 23 of each slide A and the cutting edge 21 of the corresponding cutting blade C is equal to the desired depth of the level at which the cutter blades are to work. When the attachment is urged forwardly it will turn or rotate so that the cutter blades will move across the row, below the ground surface, with a slicing movement and slice or cut off a number of plants in the row, and the feet 23 of the slides A will engage the ground between the plants to be left standing.

As a result of the foregoing operation the earth which is disturbed by the cutting blade will be pressed back firmly between the remaining standing plants. This pressing or firming of the earth prevents the remaining standing plants from falling over or being washed out of the ground in the event of a sudden rain.

It will also be noted that the cutting edge 21 of each blade is directed away from the adjacent foot 23 at a very slight angle to the face of the foot and that the blade also extends only a very slight distance radially beyond the earth contacting face of the foot. Thus it will be apparent that the edge 21 of each blade does not chop down into the earth but moves very nearly horizontally across the plant row and also it has only a very slight penetration so that a minimum of earth disturbance results.

The cutter disk rotates about the stud shaft 28 in consequence of the frictional action between the cutter blades and the ground and between the feet of the slides and the ground, so that the cutting blades remove the plants encountered by the cutting edges. The cut outs 12 in the body plate B permit the plants left in the rows to stand upright without being damaged in any way.

We claim:

1. A plant thinner to be carried and moved by a supporting structure along a plant row, said chopper comprising a supporting axle, a wheel on the axle disposed in a vertical plane arranged to extend obliquely across the plant row, said wheel having a plurality of spokes, a plurality of spaced arcuate ground pressing feet each carried by a spoke with the ground contacting face directed radially outwardly, and a plurality of arcuate blades each carried by a spoke at one side of a foot and each having a cutting edge of approximately the same curvature as the foot, said cutting edge of each blade being located slightly radially beyond the ground contacting face of the adjacent foot and directed laterally away from the foot on a line closely approaching a parallel relation to the face of the foot.

2. A plant thinner to be carried upon a frame supported by spaced wheels, said chopper being supported to travel along a plant row in a direction paralleling the path of travel of said wheels and comprising a wheel body having a plurality of spokes, a plurality of spaced segmental foot plates each carried by a spoke and having a ground contacting face directed radially outwardly and curved in the direction of the circumference of the wheel, and a plurality of cutting blades each carried by a spoke adjacent to a foot plate and having its cutting edge disposed slightly radially beyond the said face of the adjacent foot plate, the said blades each further having its cutting edge directed laterally outwardly from the side of the wheel opposite from the foot plate at an angle slightly oblique to the said face of the adjacent foot plate and away from the center of the wheel.

WILLIAM H. MAYBERRY.
C. R. MAYBERRY.

REFERENCES CITED

The following references are of record in the file of this patent:

UNITED STATES PATENTS

| Number | Name | Date |
|---|---|---|
| 367,558 | Sibley | Aug. 2, 1887 |
| 467,400 | Denney et al. | Jan. 19, 1892 |
| 916,087 | Wright | Mar. 23, 1909 |
| 961,113 | Ewing | June 14, 1910 |
| 2,137,233 | Brotzman | Nov. 22, 1938 |